(12) United States Patent
Murphy, Jr. et al.

(10) Patent No.: US 6,343,328 B1
(45) Date of Patent: Jan. 29, 2002

(54) DIGITAL COMPUTER SYSTEM USING EMBEDDED COMMENTS TO MANIPULATE VIRTUAL CONTROLLER FUNCTIONS

(75) Inventors: Thomas Edwin Murphy, Jr., Binghamton; Jeffrey Scott Stevens, Endwell, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/797,322

(22) Filed: Feb. 10, 1997

(51) Int. Cl.[7] .............................................. G06F 15/16
(52) U.S. Cl. ..................... 709/246; 709/311; 703/23; 703/27
(58) Field of Search ................. 395/200.31, 200.33; 709/246, 311; 703/23, 27

(56) References Cited

U.S. PATENT DOCUMENTS

| | | | |
|---|---|---|---|
| 5,179,703 A | 1/1993 | Evans | 395/700 |
| 5,214,779 A | 5/1993 | Barker et al. | 395/600 |
| 5,317,722 A | 5/1994 | Evans | 395/500 |
| 5,530,852 A | 6/1996 | Meske, Jr. et al. | 395/600 |
| 5,710,918 A * | 1/1998 | Lagarde et al. | 395/610 |

OTHER PUBLICATIONS

"JavaScript Guide—Netscape Navigator version 2.0", 1996 pp. 19–24.*
LAN Times, Server Side Includes take hold, Thom Stark, Mar. 4, 1996 p94(1).*
InfoWorld, IBM adds pieces to Web software vision, Ed Scannell, Oct. 7, 1996.*
Windows Magaine, Form–idable function, David Boles, Oct. 1996, p230(6).*
Dr Dobb's, Using server–side includes, Matt Kruse, Feb. 1996 p52(3).*

* cited by examiner

Primary Examiner—Dung C. Dinh
(74) Attorney, Agent, or Firm—Kevin P. Radigan, Esq.; Heslin Rothenberg Farley & Mesiti P.C.

(57) ABSTRACT

A user of an intranet or internet web browser requests a page of data from a gateway server, and the gateway server requests the page from a host. The host reads the data from storage and builds a first data stream that includes command verbs within comments and other text data and transmits the first data stream to the gateway server. The gateway server scans the first data stream for comments and parses the comments to identify command verbs and executes the commands to set control switches of the gateway server. Then the gateway server builds a second data stream depending on the setting of the control switches. The second data stream includes the comments containing the command verbs and at least parts of the text data of the first data stream. The second data stream may also include additional text, graphics, and additional commands embedded in the text. The gateway server transmits the second data stream to the web browser which formats the data according to the commands in the text and presents the data to the user.

23 Claims, 5 Drawing Sheets

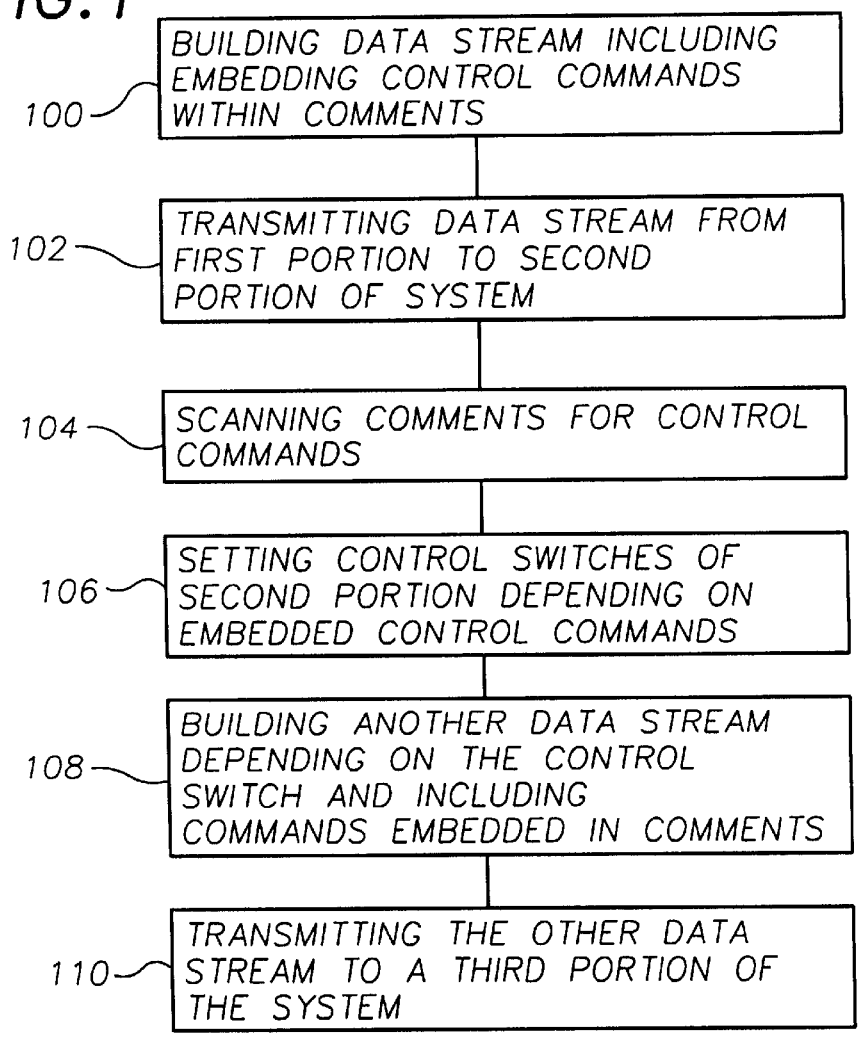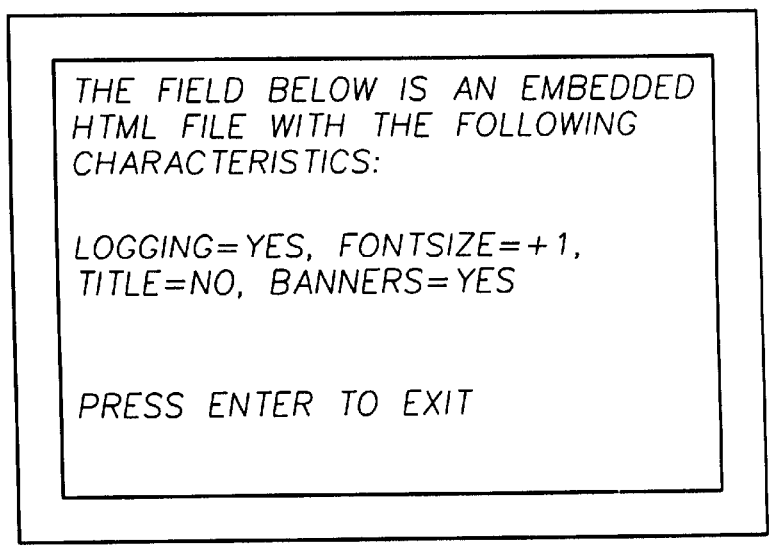

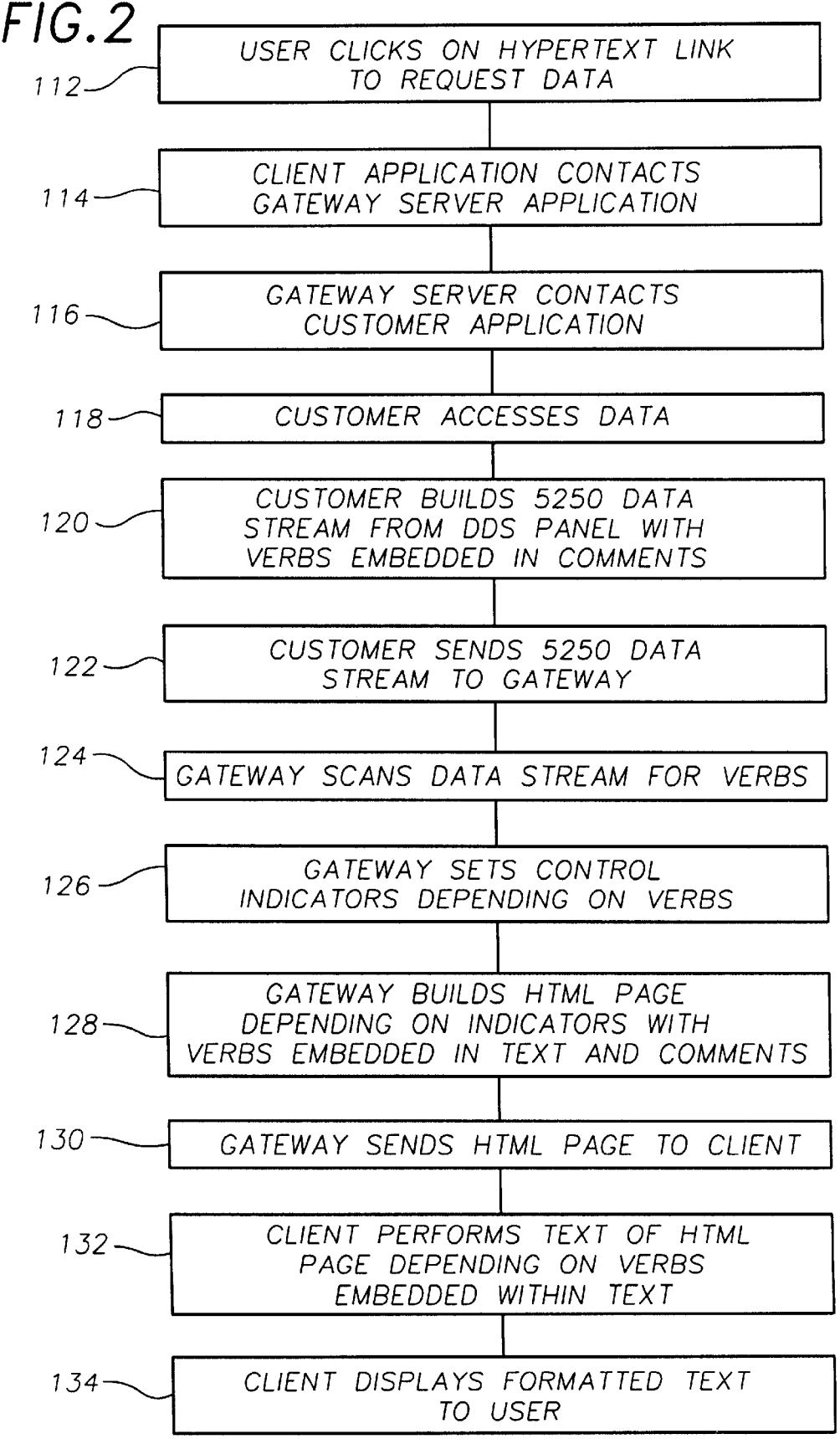

DIGITAL COMPUTER SYSTEM USING EMBEDDED COMMENTS TO MANIPULATE VIRTUAL CONTROLLER FUNCTIONS

FIELD OF INVENTION

This invention relates to the fields of mainframe communications and intranet or internet communications and more specifically to real time conversion of client data stream formats by a server.

BACKGROUND

Client/server is a type of computer system in which a client portion of the system retains responsibility for performing complex functions and a server portion of the system provides simple services for the client as requested. The client portions of the system transmit a request for a service and the server portion fulfills the request. The client and server may be implemented as special purpose hardware, but are usually implemented by programming one or more general purpose computers. Thus the client and server may be conceived of as either separate portions of hardware or as separate portions of software operating on a computer system, and both conceptions are used interchangeably herein. The client and server may be portions of the same node or may be portions of different nodes in a computer network. The programmer of the client application has to know the functions provided by the server and the format for the communication requesting a service from the server program and depending on the service, may need to know the contents and format for a response from the server program.

The client/server model is similar to traditional operating system services, but the services of a server are usually data base related rather than the device control related services traditionally provided by operating systems. The client/server model is different than the common data base transaction model, because the client keeps control of the transaction. The same program may be both a server for one client and a client of another server, depending on their relation with other programs. One type of service that may be provided by a server is translation or conversion of data streams between two clients requiring different kinds of data streams such as between a web browser and a mainframe application.

The term web browser is used for several related concepts which are differentiated by context. A "web browser" may be a person using the intranet or internet or a program used to access the intranet or internet, or the media containing such a program, or a computer programmed to access the intranet or internet. Herein, web browser will be used to refer to both the software and the hardware programmed with the software unless otherwise indicated by the context of use. Also the term web browser will be used herein globally to include gophers, FTP, Telnet, intranet browsers, and other software and hardware for accessing pages or files through the intranet or internet or an intranet. Web browsers are connected to a network such as the intranet or internet and programmed to download a page of data from a web server where the page is selected by a user. The web browser interprets commands within the downloaded page to provide a formatted presentation of the data to the user. The web server may be a portion of a computer connected to the intranet or internet and programmed to serve pages to the intranet or internet or it may be a gateway server acting as a communication gateway between one or more page servers and the intranet or internet. Servers connecting between the intranet or internet and workstations and/or other servers are referred to herein as a workstation gateway server (WSG).

Data structures transmitted between programs are referred to herein as data streams. The data transmissions may be logically classified as a single synchronous stream or as an asynchronous data stream operating simultaneously in both directions (transmitting and receiving) or as a multitude of logical streams for different purposes.

Documents accessed by the intranet or internet commonly include text with embedded commands. That is, the commands are placed within the text at the point where they will operate. The text is formatted and presented to the user in accordance with the embedded commands. Such commands are commonly written in Hypertext Markup Language (HTML), but may include non-HTML commands that are supported by popular web browsers.

The specification for HTML 2.0 and a proposed HTML 3.0 are available from the World Wide Web Consortium (http:..www.W3C.org.www). HTML is a simple text based language and HTML files usually include only ASCII text characters. Any white space (i.e. spaces, and control characters such as tab, line feed, and carriage return) embedded in the HTML document are ignored except to determine word boundaries, and the document is formatted only according to the HTML commands. HTML commands are commonly called tags and are used for formatting documents, for accessing and displaying graphics files, and for accessing other data through the intranet or internet.

The tags for accessing additional data are interpreted and executed by the web browser for example when the user hits a key or clicks a mouse button when the cursor is on highlighted text or graphic images (called click points) associated with such data. The tags consist of <, followed by text, followed by >. For example, the <P> tag starts a new paragraph and text between the <B> tag and the </B> tag is presented in bold. Comments may be used to document HTML by enclosing text between <! and > (i.e. <!comment>). Web browsers do not normally present the tags to the user but most web browsers provide an option to allow viewing the source HTML.

Some popular web browsers such as Netscape (by Netscape Communications Corporation), Internet Explorer (a product by Microsoft), and Mosaic (from the National Center for Supercomputing Applications in Urbana-Champaign, Ill.) include extensions in the form of additional tags that are not specified in the standard for HTML 3.0 such as the <META . . . > tag to perform animation and the <ISINDEX PROMPT =" . . . "> tag to prompt the user to enter a keyword to search for in a page. Also, such web browsers often have extensions to existing tags; for example, NETSCAPE has added attributes or verbs (additional commands within a tag) to the <HR> tag (which inserts rule lines) to control the width, thickness, and alignment of horizontal rule lines. If a web browser encounters a tag or attributes within a tag (that is not a comment tag) with which it is not familiar, then usually the web browser ignores the tag or attribute; but sometimes, especially if a web page has not been tested with the particular web browser, the web browser could potentially lock-up or otherwise fail when it tries to interpret the unfamiliar tag or attribute.

Other popular programming languages support comments in the source code. MS-DOS (by Microsoft) ignores lines that begin with REM, C ignores text between /* and */, Pascal ignores text between {and}.

Usually when a web browser requests an HTML file from a page server, the page server reads the file from storage and transmits the HTML file as stored, without any interpretation. The web browser interprets the HTML in the file, requests any graphics files referred to in the HTML file, and presents the text and graphics to the user formatted according to the HTML tags. HTML file names usually end with ".HTML" or ".HTM".

Some web servers support an extension of HTML known as server side includes (SSI). When the file name ends in ".SHTML", a server that supports SSI scans the file for SSI commands and replaces the SSI commands with dynamic information such as time, date, last modified, or number of previous visitors into the file. SSI commands begin with <! and end with > just like an HTML comment. Normally a server that supports SSI will remove the SSI tags before transmitting the page, but if SSI support is turned off or if the file is moved to a server that does not support SSI, the page server will transmit the SSI tags embedded in the page then the web browser will treat the SSI tags as comments.

In order to keep up with competition and to provide better products, software suppliers often introduce new versions of software with additional and improved features. When new versions of server programs are developed, the new version is usually compatible with client applications written for previous versions of the server so that existing client applications may be used with the new server with minimum problems. This is referred to in the art as backward compatibility.

The term backward compatibility is also used to describe improved client applications that are written to take advantage of features of the newest version of a server programs, but also operate at least with the previous version of a server. This is often done using system variables which control how the client application operates.

Those skilled in the art are directed to the following publications:

5494 Remote Control Unit Functions Reference Release 3.1, Order Number SC30-3533-04 from International Business Machines Corporation, describes the way that the 5494 uses SNA, SKLC, X.25, and X.21 protocols to communicate with the AS/400 and how it manages the attached workstations and converts network data streams into protocols for display stations and printers. This book is part of the 5484 online library available on the IBM Networking Systems Softcopy Collection Kit CD-ROM, SK2T-6012. Those skilled in the art can use this manual to dump and understand 5250 data streams such as those included herein in Appendix A.

AS/400 Data Description Specification V3R2, Order Number SC41-3712-01 from International Business Machines Corporation, provides detailed descriptions for coding the data description specification (DDS) for files that can be described externally. These files are physical, logical, display, print, and intersystem communication files. Those skilled in the art can use this manual to understand the use of the HTML keyword in a DDS file to create display specification panel files (DSPFs) that will embed HTML comments into a data stream.

AS/400 System Application Program Interface Reference V3R7, Order Number SC41-4801 from International Business Machines Corporation, describes the Application Program Interface (API) system calls. System API QsnQry5250 can be used to query a device to determine if it supports embedded HTML and the HTML keyword can be used. The program can determine if the 5250 datastream will be interpreted by a web browser or a standard 5250 device.

U.S. Pat. No. 5,530,852 describes a client including a browser communicating with a web server using the intranet or internet. Standard generalized markup language (SGML) data from a news source is converted into HTML by a parser/converter and served to the user.

The entire disclosure of the above citations are hereby incorporated herein.

SUMMARY OF THE INVENTION

A first portion of a computer system builds a first data stream including data and comments with commands (verbs) embedded within the comments. The first data stream is transmitted to a second portion of the system. The second portion of the system converts or transmutes the first data stream to a second data stream including the comments and converted data. In the second portion, the commands in the comments are interpreted and executed and the first data is converted depending on the commands embedded in the comments. The second data stream with the comments containing the commands are transmitted to a third portion of the system. Alternately the comments or at least the commands within the comments may be left out of the second data stream is no longer needed. The third portion of the system operates on the converted data but ignores the commands within the comments. This provided for backward compatibility of both the server and the client application.

BRIEF DESCRIPTION OF THE DRAWINGS

FIG. 1 is a flow chart of the method of the invention for controlling a portion of a computer system using commands embedded in comments.

FIG. 2 is a flow chart of a specific example is in which the commands are embedded in comments in an HTML page served through a gateway server to a web browser.

FIG. 6 is a front view of a display of a 5250 terminal that does not support embedded HTML.

DETAILED DESCRIPTION OF THE DRAWINGS

Figure 3:
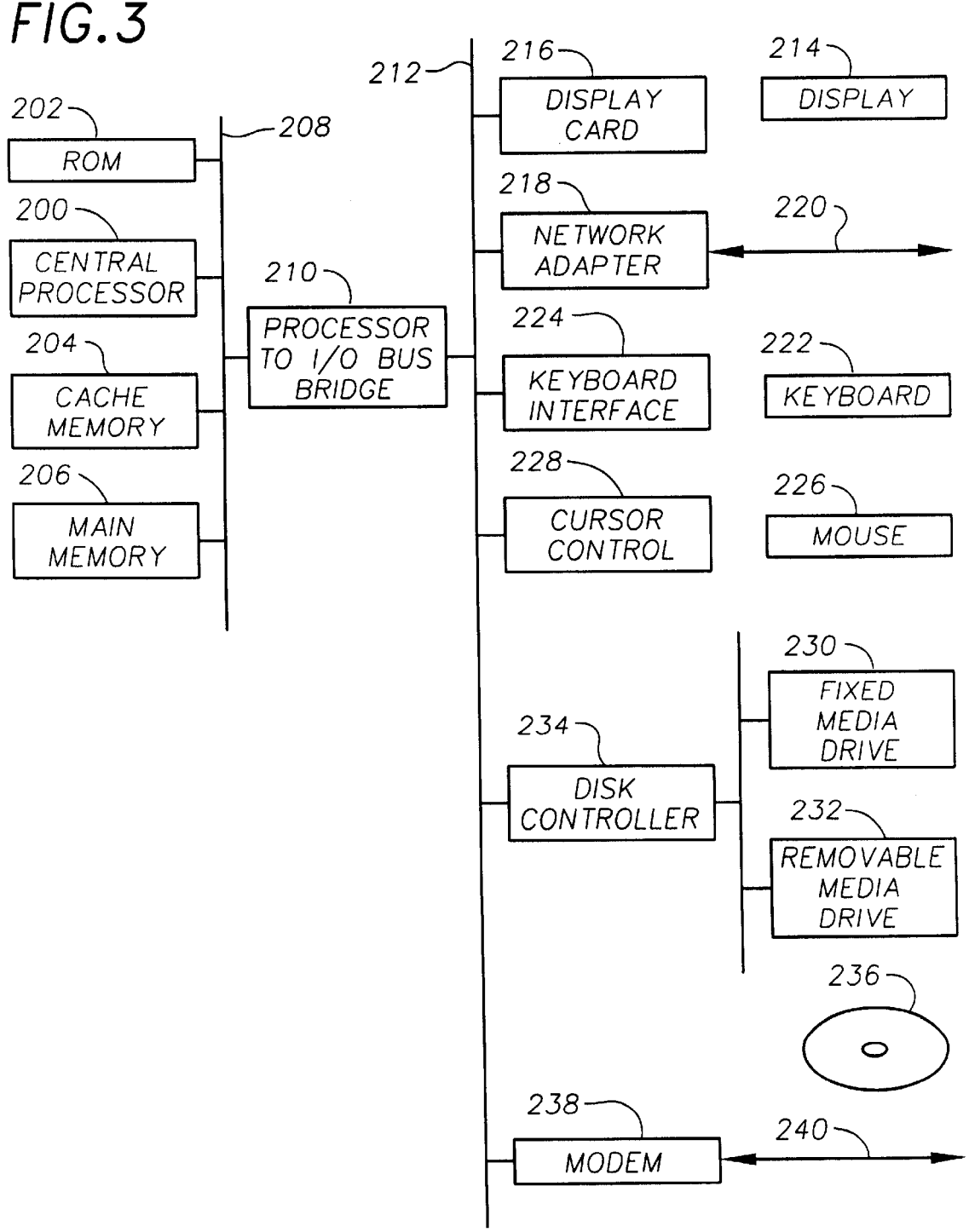
FIG. 3 is a schematic of a specific embodiment of the computer system of the invention.

FIG. 1 describes a fundamental embodiment of the method of the invention. In steps 100 and 102 in a first portion of the computer system, a data stream is built with control commands embedded within comments, and the data stream is transmitted to a different second portion of the computer system. A portion of the system may be conceived of either as a portion of the hardware of the system or as a portion of the software of the system operating on the hardware. A portion of the hardware may be a portion of time in which a program is using the hardware and other programs use the hardware at other times or a portion of hardware on which a program operates while other programs operate on other portions of the hardware and may be portion of a computer on which a program is operating or may be an isolated computer or several isolated computers communicating with other isolated computers through a network to execute a program.

A data stream is a flow of data. Although a data stream is often a continuous, undifferentiated, byte-by-byte signal flow, a data stream may be a single data packet or a parallel transmission of signals or a block transfer of data. The data stream may use any known communication medium such as twisted wire pairs, coaxial cable, radio, or optic cables and may use any known communication protocol. Typically data streams are formatted into specific data structures or packets, which are built and then transmitted after building is complete, but the stream may be built in sections and parts of the stream may be transmitted before other parts of the stream are built.

Comments may be identified in data streams by special values in data structures that identify the data as a comment structure or identify the location of a comment in the structure or by unique combinations of text which differentiate comments from other parts of the data stream. The commands within the comments may also be identified by a unique combination of text within the comment. For example, comments might begin with an unusual character such as %, $, #, or an unusual combination of characters such as //, /*, #%, etc.

In steps 104 and 106 the second portion of the computer system scans the comments in the data stream for control commands, parses any identified commands, and sets control switches of the second portion depending on any embedded control commands that are identified. The second portion would have to first identify that a part of the data stream was a comment and then scan that comment part for commands. Preferably, when a potential command is identified in a comment it would be parsed by comparing the command to values in a table of control commands that associate commands with switches and then if such a command were in the table, the switches (variables) would be set according to values stored in the table.

The control switches or variables may be mechanical but are preferably electronic and may be states of transistors or capacitors which are programmable to provide control signals to control the conversion of the first data stream into the second data stream. The switches may take the form of variables in the software or values stored in predetermined registers. The variables may be local or global within the program.

In steps 108 and 110 a second data stream is built by the second portion of the system and the second data stream is transmitted to a third portion of the system. The control switches determine how the text of the first data stream is to be converted into the second data stream. For example depending on the switch settings, the second control stream may be built by adding additional text to the first control stream or inserting additional control commands into the text of the first control stream. The second control stream may include the comments from the first control stream and may include any commands that were embedded into the comments.

FIG. 2 illustrates a specific embodiment of the method of the invention in which a gateway server provides communication between a page server and a web browser. In step 112 a user requests a web page (file) utilizing a client application known as a web browser. For example, the user may request a web page using a mouse or tab key or arrow keys to move a cursor onto a hypertext link (a graphic or highlighted text) and clicking one of the mouse buttons or keyboard keys. Alternatively, the user my use a menu to select a web page or enter the web page name at a command line. Also, the user may request the page by setting the page as the default home page and starting the the execution of the web browser program.

In step 114 the web browser contacts the gateway server that an HTML page is desired. The request for a web page is usually transmitted first to a name server which determines the routing and then the request data stream is transmitted to the gateway server. In step 116 the gateway server transmits a request data stream to the customer application (i.e. page server). The request data stream transmitted by the gateway server may be the same as the request received by the gateway server (i.e. the gateway server acts as a repeater) or may be completely different than the request data stream received by the gateway server.

In step 118 the customer (i.e. page server) reads data from a storage device such as magnetic, optical, or electronic memory and in step 120 the page server builds a data stream. The data stream may be an HTML page or may be a panel or form normally transmitted by mainframe applications to terminals or may include any other formats and types of data. The data stream may include comments with embedded commands to control subsequent processing of the data stream. In step 122 the customer application sends the response data stream to the gateway server. The transmission may use hypertext transfer protocol (HTTP) or file transfer protocol (FTP) or Gopher or transmission control protocol/intranet or internet protocol (TCP/IP) or one of the known protocols normally used for mainframe network communication (e.g. SNA, SDLC, X.25, X.21, etc.). In step 124 the gateway server program scans the data stream for comments and attempts to parse any identified comments for commands. In step 126 any commands in the comments are interpreted and control indicators of the server which control transmuting the first data stream into a second data stream are set. Some response data streams may not contain commands embedded in the comments or may not even contain comments. The invention includes systems in which a customer application embeds commands within comments and the server ignores the comments and systems in which the customer does not have the capability to embed commands within comments but the gateway server has the capability of utilizing such commands in comments. Specific examples of commands and their effects on the contents of the second data stream are described below.

In step 128 the gateway server builds a second data stream which preferably consists of an HTML page. The text and control commands embedded in the text of the second data stream depend on the control indicators which were set depending on the verbs (commands) in the comments of the first data stream. The second data stream also may include the comments containing control verbs that were included in the first data stream. In step 130 the gateway server transmits the HTML page to the client application (i.e. web browser) through a communication media using a communication protocol. The medium may consist of optical cables, coaxial cables, twisted wire pairs, radio transmission or other known communication media, and the protocol used for communication may include hypertext transfer protocol (HTTP) or file transfer protocol (FTP) or Gopher or one of the other known communication protocols.

In step 132 the client application (web browser) formats the text of the HTML page depending on verbs (tags) embedded within the HTML text and in step 134 the formatted text is displayed to the user. Any commands (verbs) embedded within comments are ignored by the web browser and the comments are not normally included in the formatted text presented to the user. The formatted text may be displayed on a cathode ray tube (CRT) display, or a liquid crystal display (LCD), or another type of display.

FIG. 3 shows an example of a computer that could be used to implement the inventions herein. A central processor unit 200 (CPU) is connected to a read only memory 202 (ROM), cache memory 204, and main memory 206 by processor bus 208. Processor bus 208 is interconnected to I/O bus 212 by bridge 210. Display 214 is connected to display card 216 which is connected to the I/O bus. Network adaptor 218 interfaces between I/O bus 212 and network 220. Keyboard 222 is connected to the keyboard interface 224 which is connected to the I/O bus. Mouse 226 is connected to cursor control interface 228 which is connected to the I/O bus. Drive 230 containing fixed media (i.e. the media is not easily removable) and drive 232 for removable media are connected to disk controller 234 which is connected to the I/O bus. Removable media 236 may be used in drive 232 for storage of data such as programs. Modulator/Demodulator (MODEM) 238 is connected between the I/O bus and a communication network 240. Many similar computer system configurations are well known in the art, and the best mode for implementing the invention uses one of these programmed general purpose computers.

The computer is programmed to implement the inventions herein by introducing program signals to the computer and storing the signals. The signals may be introduced and stored for example, by replacing the ROM, main memory, or fixed media drive. Alternatively the signals may be introduced to the computer by downloading the signals from computer network 220 or communications network 240, or by inserting removable media 236 into media drive 232 and operating the drive, then the signals may be stored in RAM or on a fixed drive. Other known methods of programming computers such as bar code input or keyboard input may also be used. The inventions herein may be implemented by programming removable computer media or electronic computer memory which is then connected or used in the computer or by connecting another computer containing the required programs to a network to which the computer is connected, and downloading the program into the computer.

The computer system of FIG. 3 may be used for the page server or gateway server or web browser of this invention. Additional hardware may be required for such use. For example, an additional network adapter may be required for a gateway server. In addition, two or all three of these programs (customer application, gateway server, web browser) may be loaded on a single computer system and operated at different times using a multitasking operating system. Furthermore, any of these programs may be divided and parts run on more than one of the computers of FIG. 3.

Removable media 236 is shown as a disk such as an optical or magnetic disk, but an optical or magnetic tape or card may be used equivalently. Signals are stored on magnetically hard media using an inductive write or read/write head to rotate the polarity of magnetic regions on the surface of the media to a new fixed orientation. A magnetic head (inductive or magnetoresistive) may then be used with the media to determine whether signals have been stored in such regions. Signals may be stored in optical media by changing the reflectance of a region of the media by using one or more higher power laser beams so that subsequently one or more lower power laser beams can determine if that region has been so affected. The stored signals are arranged so that signals may be generated using the media to produce the programmed computer systems of the invention.

Figure 4:
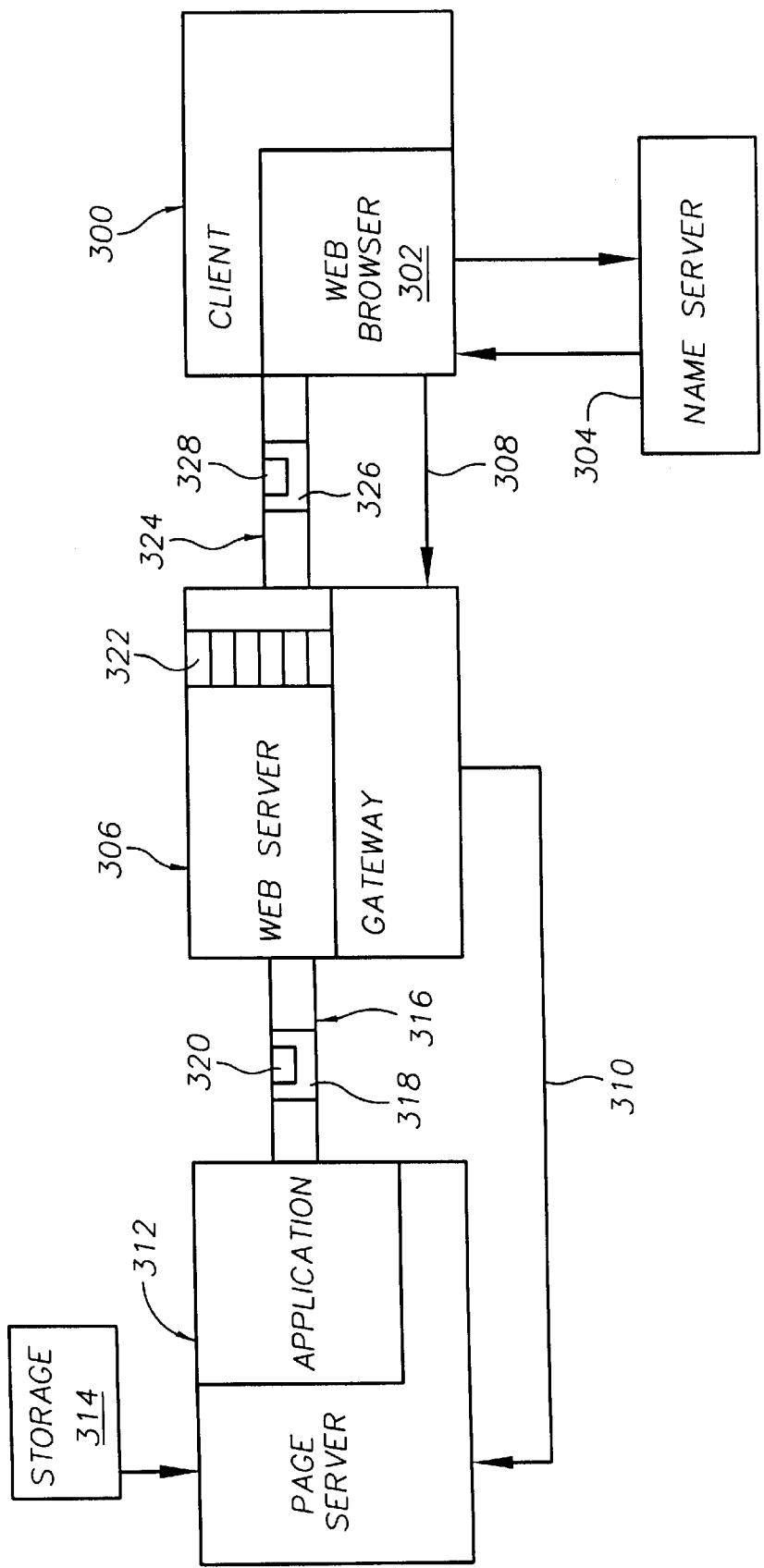
FIG. 4 is another schematic of the computer system of the invention illustrating interconnection of a page server portion, gateway server portion, and web browser portion.

FIG. 4 illustrates a computer system of the invention in which a web browser accesses a page server through a gateway server. A client portion 300 of the system includes a web browser 302 for communicating over the intranet or internet. The web browser accesses a name server 304 to determine the uniform resource location (URL) of the gateway server portion 306 of the system. Then the web browser transmits a data stream 308 to the gateway server to request data. Gateway server 306 transmits a data stream 310 to a page server portion 312 of the system. The page server (customer) accesses storage 314 for the data and builds a first response data stream 316 which is transmitted to the gateway server. The first response data stream includes comments 318 which include command verbs 320. The gateway server scans the first response data stream for comments and parses any commands in the comments to set switches 322. Then gateway server 306 builds a second response data stream 324 depending on how the switches are set. The second data stream may include comments 326 that were in the first data stream which comments may contain the commands 328 which were used to set switches 322.

Figure 5:
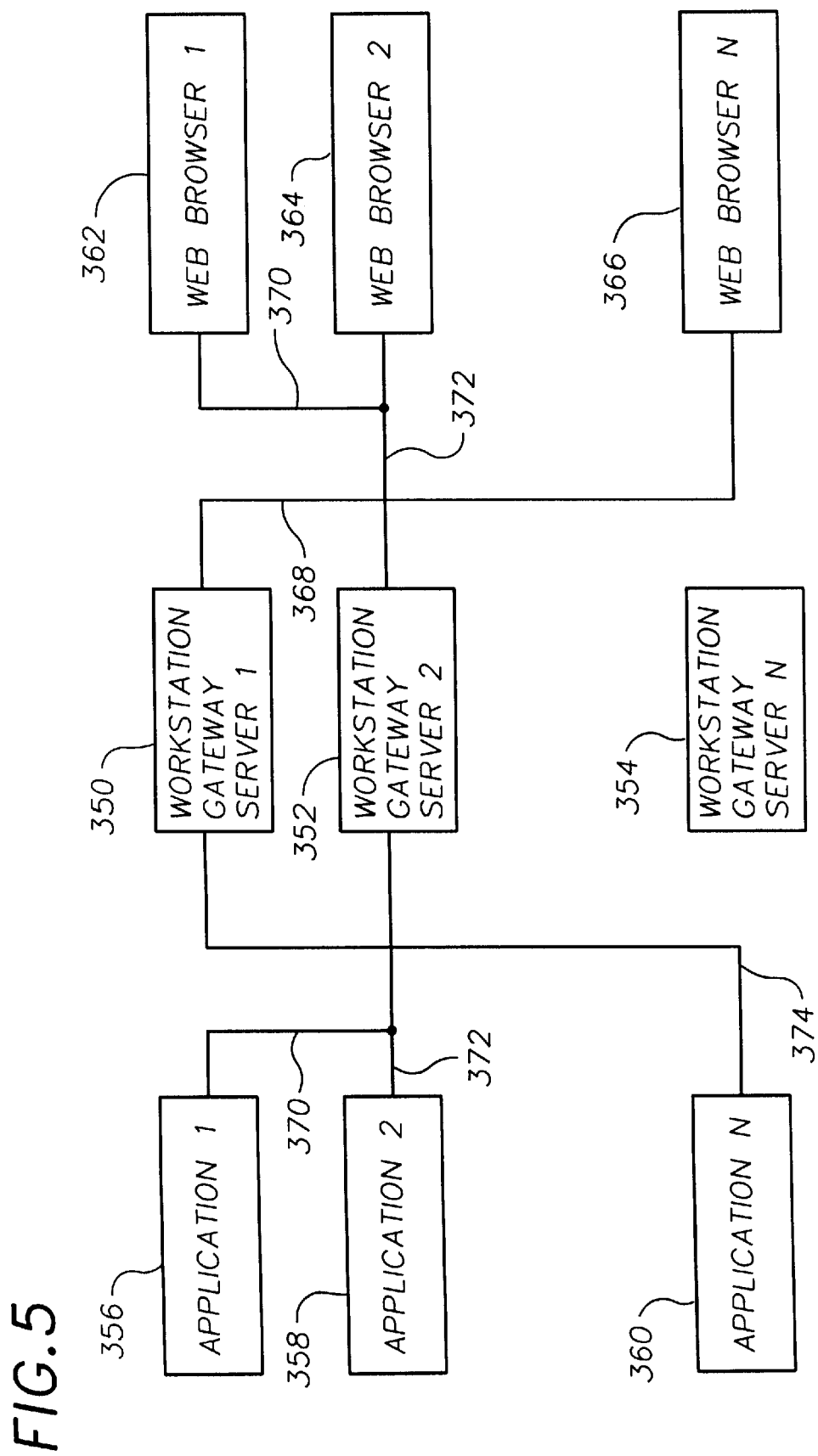
FIG. 5 is a schematic diagram illustrating gateway servers multiplexing one or more applications with one or more web browsers.

FIG. 5 shows a specific example of one or more gateways 350, 352, and 354 connect between one or more applications 356, 358, and 360 and one or more web browsers 362, 364, and 366. One or more applications may be connected to one gateway server, and one or more web browsers may be connected to one gateway. The applications may not all be connected to the gateway servers and the gateway servers may not all be attached to all the web browsers. Applications 356 and 358 are connected by 5250 data streams 370 and 372 respectively to gateway 352, and application 360 is connected to gateway server 350 by 5250 data stream 374. Gateway 350 is connected to web browser 366 by TCP/IP network 368 and workstation gateway server 352 is connected to web browsers 362 and 364 by TCP/IP networks 370 and 372.

As a specific first example, a host application operates on an AS/400 and communicates with users at 5250 terminals through a computer network by sending display panels of data in a standard 5250 display data stream. Users at the 5250 terminals respond by sending a standard 5250 response data stream to the host containing text input and predetermined commands initiated by pressing one of the function keys of the terminal.

Another AS/400 programmed as a gateway server, is added to the computer network for communication with users through the intranet or internet. A program operating on the gateway server converts the 5250 display panels to HTML pages including the insertion of click points in the text to emulate the function keys (i.e. graphics shaped like function keys with text such as PF1, PF2 etc.), which the intranet or internet user can use instead of function keys. Typically keyboards of web browser machines have 10 or 12 function keys. 5250 display terminals have 24 function keys, but in many panels less than half the function keys are assigned to any function.

The server program is modified so that the 5250 display data stream includes a comment containing a command indicating the number of function keys and the text to be inserted into the click points for the keys. The gateway server program is modified to scan comments and parse the commands embedded within the comments to control the modification of the data streams. The terminals of terminal users ignore the comments and the web browsers of intranet or internet users ignore the comments, but the gateway server program can provide intranet or internet users with screens that are better suited for that medium. The same customer application can send duplicate data streams to terminal users and through the gateway server to intranet or internet users and control the customization of displays of the intranet or internet users by using the commands embedded in the comments. Also, the host application can operate with a gateway server that has not been modified, in which case the comments will just pass through and be ignored by the web browser. Furthermore, the modified gateway server can continue to serve other host applications which have not been modified to take advantage of the new capability. Thus, the revision is backward compatible for both hosts and gateway servers.

A second specific example will be described with reference to FIGS. 5 and 6 and to the code and data structures included in Appendix A. In this second example the application program has been modified so that when a request for data is received, the application queries the computer system to determine whether the client is compatible to a 5250 terminal or is a web browser. It reads a data file from mass storage and builds a first data stream. The building of the data stream includes embedding HTML into the data stream including inserting control commands or verbs into HTML comments in the data stream. In this second example, the verbs inserted within the comments depend on whether the client is a web browser or 5250 workstation. The first data stream is transmitted to the workstation gateway.

In this second example the gateway has been modified to build an HTML document depending on the verbs within the comments in the first data stream when the target is a web browser. That is—the contents of the HTML pages are changed depending on what verbs the comments contain. Alternatively when the target device is a 5250 compatible terminal or terminal emulator, the gateway server builds a 5250 data stream and sends it to the 5250 terminal.

Two example first data streams and the resulting HTML pages which will be sent to a web browser are included in Appendix A. The first example data stream received from the application and resulting HTML page transmitted to the web browser begins on page 1 of Appendix A. The second example data stream received from the application and the resulting HTML page sent to the web browser starts at the top of page 6 of Appendix A. The HTML page for the web browser will be displayed to the user by the web browser program. In this example command verbs within comments are delineated by a # character and related values are delineated by an = character.

The control tags used within comments in this second specific example and their effects are as follows:

LOGGING=YES Toggles program logging on if equal to YES, otherwise no logging. Scale the font for all button objects.

FONTSIZE=+1 +1 to increase size, −1 to decrease size. Includes an enlarged title on the TITLE=NO screen if equal to NO. Include graphical banners at the top BANNER=YES and bottom of the page if equal to YES The HTML comments with embedded commands for 5250 clients are embedded in a data stream panel file (DSPF) and transmitted to the 5250 client. An example DSPF file is included in Appendix A starting on Page 11. The source code of an AS/400 CL program which displays a panel described in the DSPF file is shown at the beginning of page 12 of Appendix A. The DSPF file for Page 12 of Appendix A shows the AS/400 DSPF display file that describes a panel for display to a user at a 5250 terminal. If the 5250 supports embedded HTML then the panel will look similar to an HTML page presented by a web browser. If the 5250 display terminal does not support embedded HTML then the user screen appears as shown in FIG. 6.

The invention has been described with reference to specific embodiments including the best mode for carrying out the invention, and with sufficient detail that anyone skilled in the art can utilize the invention. Those skilled in the art may modify these embodiments within the spirit of the invention, and thus, the description does not limit the present invention to the disclosed embodiments. The invention is limited only by the following appended claims:

What is claimed is:

1. A method of operating a digital computer system having a customer application executing therein which communicates through a gateway and across a network with a client coupled thereto, comprising:

receiving network requests for data at the customer application via a continuous connection with the gateway;

retrieving data from mass storage by the customer application via a continuous connection therewith;

building a first data stream by the customer application including embedding control verbs within comments within the retrieved data;

transmitting the first data stream via the continuous connection from the customer application to the gateway;

scanning by the gateway the comments in the first data stream for control verbs;

setting control switches within the gateway responsive to the control verbs in the comments;

building a second data stream at the gateway including at least part of the data of the first data stream, the building being controlled by the control switches set responsive to the control verbs embedded within comments of the first data stream; and transmitting the second data stream from the gateway to said client of the system across the network.

2. The method of claim 1, further comprising:

transmitting a request for data from the client to the gateway across the network;

relaying the request for data from the gateway to the customer application via a continuous connection;

including data text, by the customer application in the first data stream in which the comments are embedded;

the customer application embedding control commands within the text of the first data stream;

the gateway including at least parts of the text in the other data of the second data stream;

the gateway including at least some of the control commands of the text of the first data stream within the other data of the second data stream;

the gateway including text in the second data stream which is not included in the first data stream;

the gateway including control commands in the second data stream that are not in the first data stream; and formatting and presenting the data on a display of the client of the system, depending on the commands embedded within the text.

3. The method of claim 1, wherein said first data stream comprises a device specific protocol data stream.

4. The method of claim 1, wherein said first data stream comprises a 5250 data stream.

5. The method of claim 1, wherein the client is a Telnet emulator.

6. The method of claim 2, wherein the client is a Telnet emulator.

7. A digital computer system having a customer application executing therein which communicates through a gateway to a client, comprising:

the gateway including means for scanning for commands embedded within comments in a first data stream built by the customer application and means for building a second data stream including the comments with embedded commands of the first data stream, controlled by the commands in the comments;

means for receiving the first data stream at the gateway from the customer application of the system via a continuous connection therewith; and means for transmitting the second data stream from the gateway to the client.

8. The system of claim 7 wherein the customer application comprises means for retrieving data from storage, means for building the first data stream including the retrieved data, the means for building including means for embedding commands within comments, and means for transmitting the first data stream via a continuous connection to the gateway of the system;

the customer application, the gateway, and the client are different nodes connected together by one or more computer networks of the system; and the means for transmitting the first data stream via the continuous connection include a first computer network connected between the customer application and the gateway of the system, and the means for transmitting the second data stream include a different second computer network connected between the gateway and the client of the system.

9. The system of claim 7, wherein said first data stream comprises a device specific protocol data stream.

10. The system of claim 7, wherein said first data stream comprises a 5250 data stream.

11. The system of claim 7, wherein the client is a Telnet emulator.

12. A node for a computer network, comprising:

mass storage;

means for retrieving data from the mass storage;

means for building a first data stream including at least a portion of data retrieved from mass storage and comments with embedded commands wherein a first portion of the comments would be completely ignored by a web browser node and a second portion of the comments would be scanned and at least a portion of the embedded commands executed by a gateway node;

means for building a second data stream, at the gateway node, which includes at least a portion of the first data stream based on the at least a portion of the embedded commands; and means for transmitting the second data stream from the node through the gateway node to the web browser node through a computer network.

13. The node of claim 12, wherein said first and second data streams comprise 5250 data streams.

14. The node of claim 12, wherein said first and second data streams comprise device specific protocol data streams.

15. The node of claim 12 further comprising means for scanning, at the gateway node, to identify commands in the comments of the first data stream.

16. The node of claim 12 wherein the data stream transmitted from the node through the gateway node to the web browser node through the computer network is a Telnet data stream.

17. The node of claim 12, wherein the web browser node is a Telnet emulator.

18. The node of claim 12 further comprising means for setting control switches, at the gateway node, depending on the embedded commands in the first data stream.

19. The node of claim 18 wherein the means for building a second data stream comprises means for building the second data stream depending on the settings of the control switches.

20. Apparatus for programming a computer, comprising:

program means for scanning at a gateway to identify command verbs in comments in a first data stream, means for setting control switches, at the gateway, depending on the command verbs in the comments and means for building a second data stream, at the gateway, depending on the settings of the control switches;

program means for receiving the first data stream, at the gateway, from a computer network via a continuous connection; and program means for transmitting the second data stream, from the gateway, through another different computer network.

21. The apparatus of claim 20 consisting essentially of computer readable media.

22. The apparatus of claim 20, wherein said first data stream comprises a device specific protocol data stream.

23. The apparatus of claim 20, wherein said first data stream comprises a 5250 data stream.

* * * * *